United States Patent [19]

Adams

[11] 4,044,630

[45] Aug. 30, 1977

[54] ADJUSTABLE ECCENTRIC

[75] Inventor: Donald N. Adams, Pittsburgh, Pa.

[73] Assignee: Koppers Company, Inc., Pittsburgh, Pa.

[21] Appl. No.: 668,214

[22] Filed: Mar. 18, 1976

Related U.S. Application Data

[63] Continuation of Ser. No. 535,835, Dec. 23, 1974, abandoned.

[51] Int. Cl.² ............................................. G05G 1/00
[52] U.S. Cl. .................................... 74/600; 74/571 R
[58] Field of Search ................. 74/600, 571; 403/352, 403/351

[56] References Cited

U.S. PATENT DOCUMENTS

| 1,401,539 | 12/1921 | Knapp et al. | 74/600 |
| 2,319,485 | 5/1943 | Alabrune | 74/600 |
| 2,592,237 | 4/1952 | Bradley | 74/571 R |

Primary Examiner—Wesley S. Ratliff, Jr.
Attorney, Agent, or Firm—R. Lawrence Sahr; Oscar B. Brumback

[57] ABSTRACT

An eccentric having a variable eccentricity that is adapted for use with drive units that oscillate a continuous casting mold is readily adjustable to suit the desired speed of withdrawal of cast strands of different cross sectional sizes.

3 Claims, 6 Drawing Figures

ADJUSTABLE ECCENTRIC

This is a continuation, of application Ser. No. 535,835, filed Dec. 23, 1974, now abandoned.

BACKGROUND OF THE INVENTION

Continuous casting mold oscillating units must be capable of operating at different speeds since the speed of oscillation varies for different cross sectional sizes of the cast strand. Heretofore, in order to change the mold oscillating speed, it has been necessary to change the drive shaft by installing one with a different eccentricity. Such work is time consuming and it requires the stocking of many drive shafts with different eccentricities.

BRIEF SUMMARY OF THE INVENTION

An eccentric in combination with a shaft includes a protrusion on the shaft and a hub that has an aperture within which the protrusion in disposed. Means is provided for securing the hub to the shaft and is so constructed and arranged that the hub coacts with the protrusion and is variably positionable with respect to the protrusion. A housing surrounds the hub and supports means that coacts with the housing and the hub. The hub is rotatable within the housing.

For a further understanding of the invention and for features and advantages thereof, reference may be made to the following description and the drawing which illustrates a preferred embodiment of equipment in accordance with the invention.

DETAILED DESCRIPTION

The present invention relates to eccentric drive devices and, more particularly, to an adjustable eccentric.

Eccentric devices have been used heretofore for many purposes, and one purpose is to convert rotary motion about an axis to reciprocatory motion along a linear axis that is perpendicular to the axis of rotation.

One aspect of the present variable eccentric invention is an eccentric apparatus for varying the reciprocatory stroke (vertical) of a continuous casting mold.

In co-pending application Ser. No. 418,869 filed Nov. 23, 1973, it is therein stated that the main beam, which is connected to and supports a mold table that carries a continuous casting mold, may be connected to a motor driven eccentric which is one device that converts the rotary motion of a powered drive shaft to vertical reciporcatory motion that is the stroke of the continuous casting mold.

Figure 1:
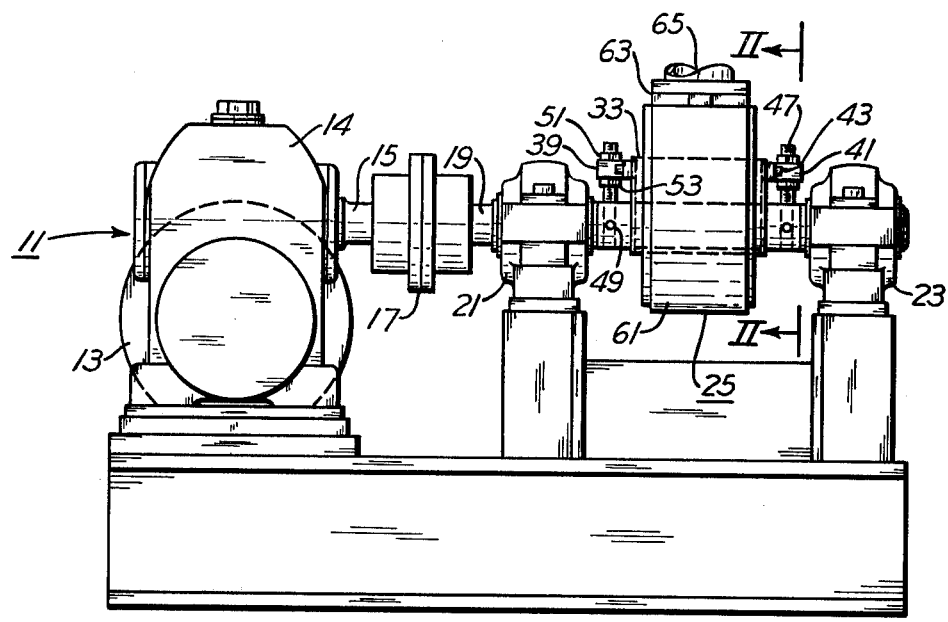
FIG. 1 is an elevational view schematically showing one embodiment of the invention as applied in a power train.

FIG. 1 illustrates such a motor drive arrangement 11 which comprises a motor 13 (electric or hydraulic) and a speed reducer 14, in conventional assembly, having a power-drive output shaft 15 that is coupled, as at 17, to a driven shaft 19 journaled in bearings 21, 23.

Between the bearings 21, 23 is a variable eccentric 25 in accordance with the invention that is mounted to the driven shaft 19.

Figure 2:
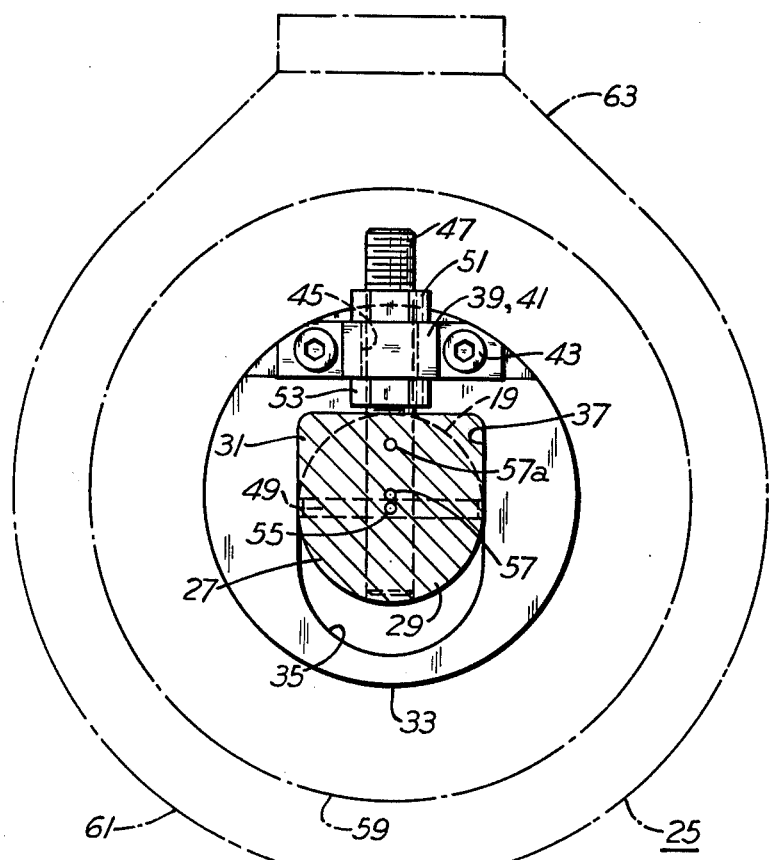
FIG. 2 is a view along line II—II of FIG. 1.

The driven shaft 19 is round generally, but it has an enlarged portion 27, at the location where the eccentric 25 is mounted. The enlarged shaft portion 27 includes, as shown in FIG. 2, a semi-circular portion 29 and a rectangular portion 31, which together comprise a "D-shaped" enlarged shaft portion 27.

A hub 33, that has a cylindrical body portion, also has a "D-shaped" aperture 29 in it which includes a semi-circular portion 35, having a diameter that is substantially the same as the diameter of the D-shaped portion 27, and a rectangular portion. The rectangular portion has the same width, as viewed in FIG. 2, as the diameter of the D-shaped enlarged portion or protrusion 27, but the longer, vertical side dimension is greater than the corresponding dimension of the D-shaped enlarged shaft portion or protrusion 27.

Two brackets 39, 41 are mounted to the hub 33 by means of suitable fasteners 43, and each bracket 39, 41 has an aperture 45 through which one end portion of a threaded rod 47 extends.

The other end portions of the rods 47 are also threaded and they are screwed into threaded holes in the driven shaft 19. These rods are fixed in place in the shaft 19 by suitable means, such as dowel pins 49 or in any other appropriate manner. As shown in FIGS. 1 and 2, two nuts 51, 53 are threaded onto each free end portion of the rods 47, the nuts being arranged to coact with each bracket 41 as shown in FIG. 2. Thus by adjusting the position of the pair of nuts 51, 53 on the rods 47, various positions of the hub 33 relative to the "D-shaped" enlarged portion 27 is effected.

As may be noticed from FIG. 2, the rotational axis of the drive and the driven shafts 15 and 19, respectively, is indicated at point 55. The center of the cylindrical hub 33, as shown in FIG. 2, is at point 57, which is eccentric vertically with respect to the point 55. The center of the hub, at point 57, is adjustably located with respect to the fixed axis of rotation of the shaft 19, which is shown at point 55, by means of the nuts 51, 53. At the position shown in FIG. 2, the eccentricity of point 57 is a minimum. However, by adjusting the nuts 51, 53, the relative position of the hub 33 to the enlarged shaft portion 27 can be varied and the center of the hub can be placed in position 57a. At that point, the eccentricity of the hub is a maximum.

The vertical distance moved by the hub when shaft 19 rotates, relative to the axis of rotation of the shaft 19, is equal to twice the distance from point 55 to point 57.

The hub 33 is surrounded by and cooperates with a bearing 59 that is disposed in and forms a part of housing 61 around the hub, as shown in FIG. 2. The housing is so shaped at one location 63 that it is connectable to a rigid member 65 (FIGS. 1, 3, 3a, 4, 4a). The rigid member 65 is thereby movable linearly and reciprocatingly when the shaft 19 rotates.

Figure 3:
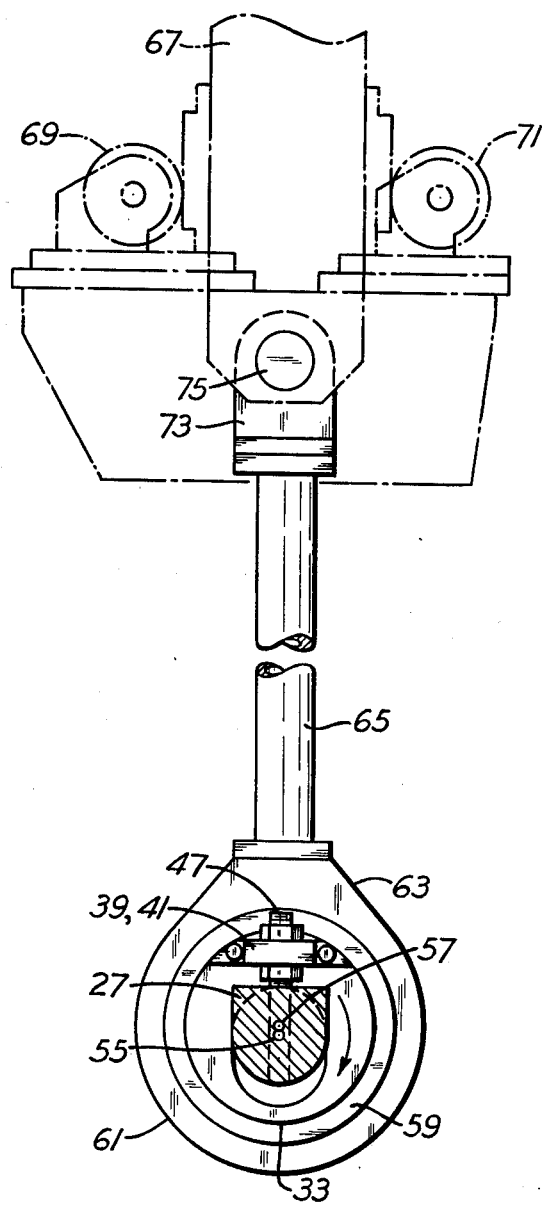
FIGS. 3 and 3a and FIGS. 4 and 4a show the embodiment of the invention of FIGS. 1 and 2 in various operative positions.
Figure 4:
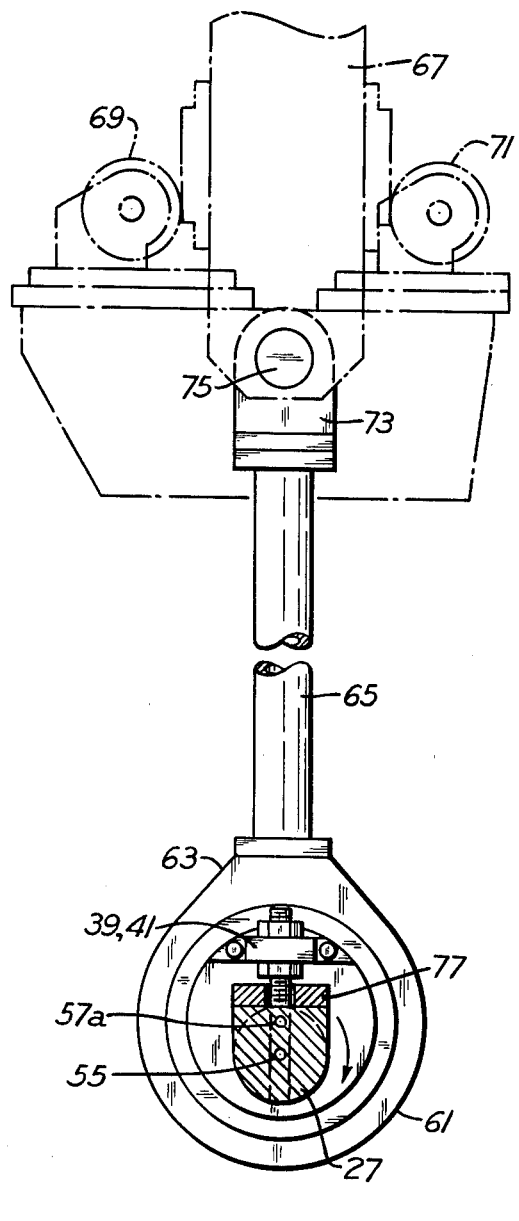
Figure 4A:
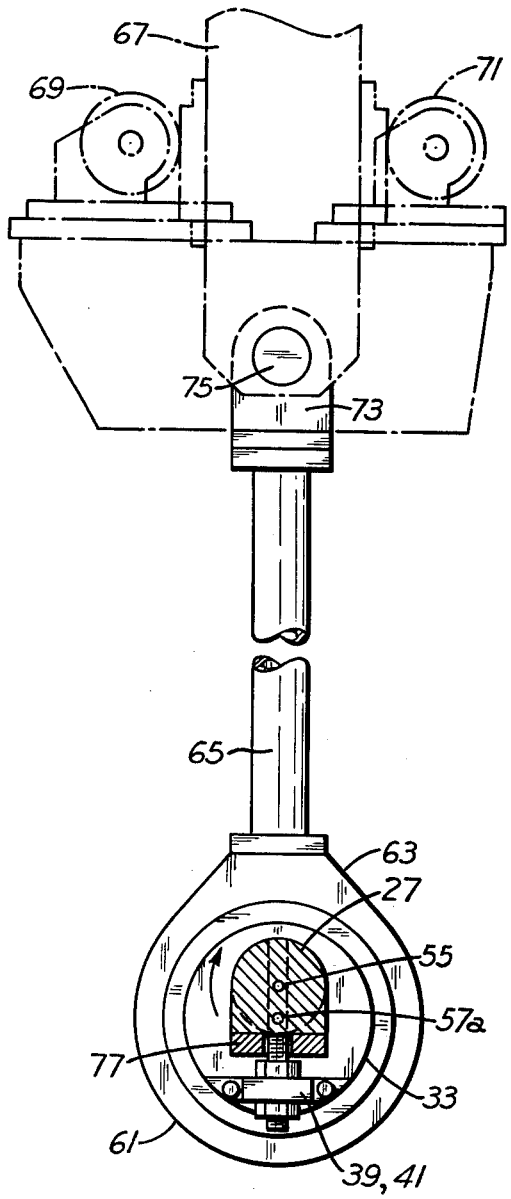

The co-pending application referred to herein describes and shows apparatus supporting a continuous casting mold on a mold table, and the apparatus includes a vertical member 67 that coacts with pairs of fixed rollers 69, 71. One pair of such rollers, at the lower end of the vertical member 67, are the rollers 69, 71 that are shown in FIGS. 3, 4a, 4, 4a.

The lower end of the vertical member 67 is connectable to apparatus for reciprocating the member and, as a result, the continuous casting mold moves vertically.

In FIGS. 3, 3a, 4 and 4a, the vertical member 67 is connected to a clevis 73 by a conventional clevis pin 75, and the clevis is fixed to one end of the rod 65 secured to the housing 61. The housing 61, is, of course, reciprocable when the motor 13, acting through the conventional speed reducer 14 turns the shaft 19, the hub 33 of the eccentric 25 turning as the shaft 19 turns.

When the shaft 19 rotates about its longitudinal axis, the center of the hub 33, which may be at any point between the points 57 and 57a, rotates eccentrically about the center 55, which is the axis of rotation of the shaft 19.

The eccentricity of the hub is adjustable by locating the nuts 51, 53 on the threaded rod 47 at various places.

Figure 3A:
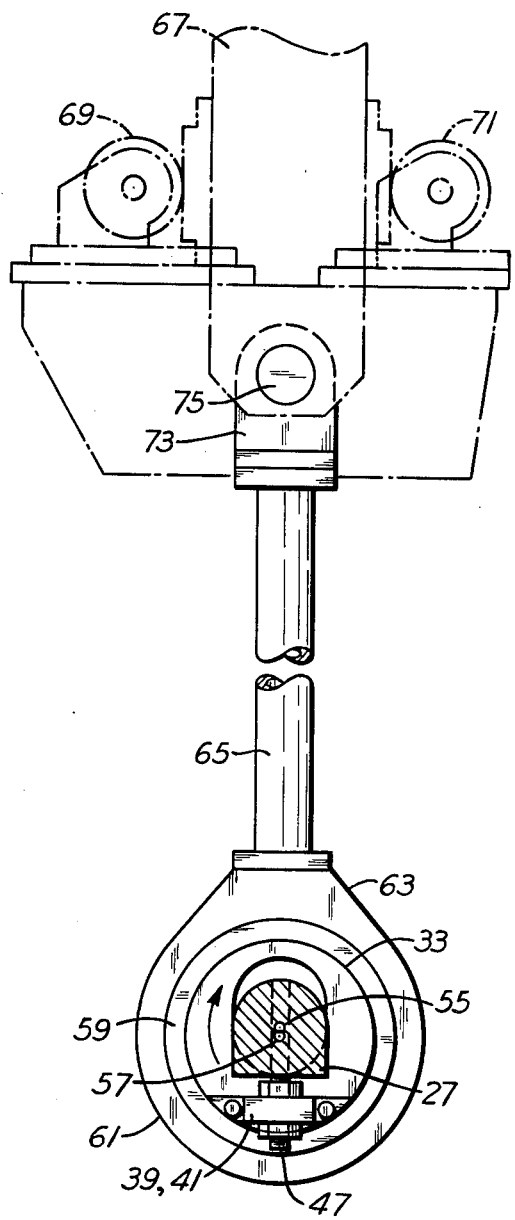

FIGS. 3 and 3a show the hub 33 in position for the minimum stroke of the member 67, and FIGS. 4 and 4a show the hub 33 in position for the maximum stroke of the member 67. The selected eccentricity is fixed by inserting a "shim" 77 of specific size and thickness between the "D-shaped" shaft surface and the D-shaped opening in the hub 33, as and where shown in FIGS. 4 and 4a. Tightening of the nuts 51, 53 clamps the hub 33, the shim 77 and the D-shaped enlarged portion 27 of shaft 19 together whereby these units rotate as one unit.

As the hub 33 rotates about the point 55 on the axis of the shaft 19, the hub rotates in the bearing 59 which does not rotate. The housing 61, however, vertically reciprocates relative to the axis of the shaft 19. The reciprocatory motion of the housing 61 produces reciprocatory motion to the elongate member 67, and consequently to the continuous casting mold.

From the foregoing description of one embodiment of the invention, those skilled in the art should recognize many important features and advantages of it, among which the following are particularly significant:

That stroke of the eccentric device, which is measured by twice the eccentricity of the point 57 from point 55, by readily adjusted by relocating the nuts on the rods and by inserting a shim of proper size in the device;

That the eccentric is simple to construct and is easy to adjust, service and maintain; and That the eccentricity of the device can be set accurately and quickly by merely inserting a shim of proper thickness.

Although the invention has been described herein with a certain degree of particularity it is understood that the present disclosure has been made only as an example and that the scope of the invention is defined by what is hereinafter claimed.

What is claimed is:

1. Apparatus that oscillates the casting mold of a continuous casting machine, wherein the improvement comprises:
   a. a shaft journaled for rotation about a horizontal axis;
   b. means for rotating said shaft;
   c. a D-shaped protrusion on said shaft;
   d. a hub having an aperture within which said D-shaped protrusion is disposed in slidable contact therewith;
   e. a housing intimately surrounding said hub and secured to means connected to said mold for actuating said mold;
   f. means disposed in said aperture and coacting with said hub and said protrusion for maintaining said hub and said protrusion in intimate contact and in preselected relative positions; and
   g. means including a shim for variably positioning said hub relative to said protrusion.

2. The invention of claim 1 wherein:
   a. said means for variably positioning said hub further includes at least one rigid member secured to said shaft and adjustably connected to said hub.

3. The invention of claim 2 wherein:
   a. said rigid member includes a rod pin connected at one end to and rotatable with said shaft and threaded on the other end with nuts thereon coacting with a projection on said hub.

* * * * *